United States Patent Office 3,407,510
Patented Oct. 29, 1968

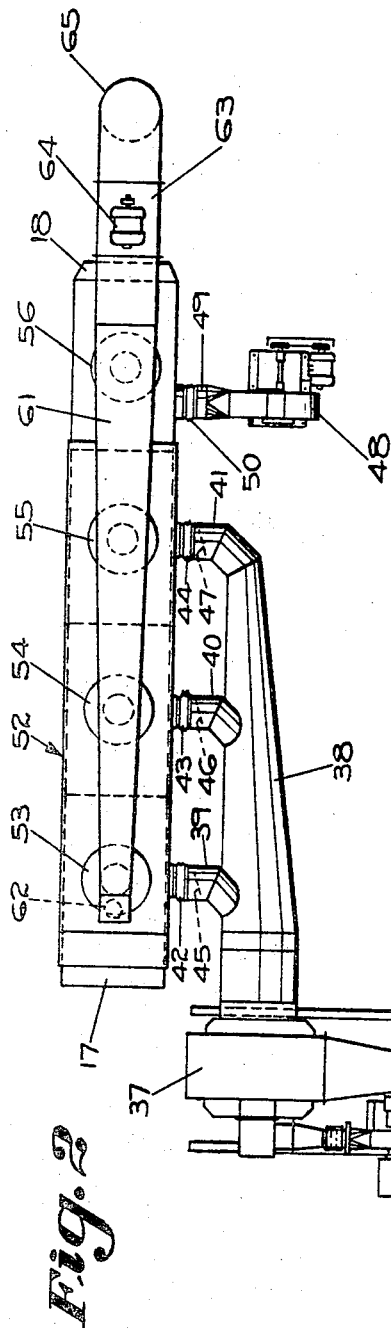
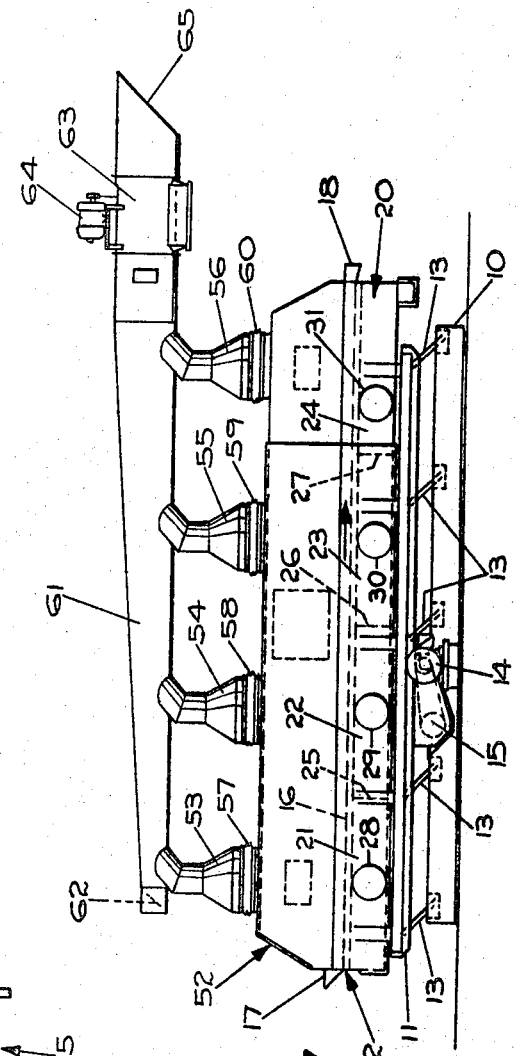

3,407,510
DRYING PARTICULATE MATERIAL
John M. Lewis and Carl J. Verhine, Upper Arlington, Ohio, assignors to Jeffrey Galion Manufacturing Company, a corporation of Ohio
Filed Apr. 10, 1967, Ser. No. 629,521
2 Claims. (Cl. 34—22)

ABSTRACT OF THE DISCLOSURE

Drying particulate material by a hot gaseous drying medium which heats the moisture and the material. The moisture is evaporated and carried off by the gaseous drying medium. The particulate material is then further dried by a gaseous drying medium that is cooler than the material, and the moisture is evaporated by the heat of the material and carried off by the gaseous drying medium.

---

The instant invention is in an improved apparatus and process for the drying of particulate material by a gaseous drying medium which carries off the moisture as vapor.

Particulate material, such as sand, is usually produced in a wet condition. Such wet sand is acceptable for some uses, as in the production of cement and concrete products, such as block, reinforced concrete and paving materials. However, it is frequently necessary to supply sand in a dry condition, for example, for the production of glass, for foundry uses, for sand blasting and for hot-mix asphalt plants.

Wet sand has been dried in rotary dryers. Such equipment will satisfactorily dry the sand, but in the course of producing the dry sand the temperature of the sand is raised so high that the sand is too hot to handle, and may even require special mechanical equipment to withstand the higher temperatures. Further, foundries are now using low temperature binders which require cool sand for efficient blending and bench life in the making of sand cores. Sand is an effective insulator and when the hot sand is put into storage or shipped in a boxcar or truck, it will still be quite hot, even after the passage of some time. Therefore, it is desired, and in many cases, it is mandatory that the sand be dried without raising the temperature of the sand very much above the ambient temperature so that it may be conveniently handled and used.

Accordingly, it is an object of this invention to provide an improved apparatus and process for drying particulate material.

It is another object of the invention to provide an improved apparatus and process for drying particulate material, in which the dried material is produced at approximately ambient temperature.

It is a further object of this invention to provide an improved apparatus and process for drying particulate material, in which a gaseous drying medium is utilized, and such gaseous drying medium is introduced to the material and the moisture is evaporated from the material and carried off in the gaseous drying medium.

It is also an object of this invention to provide an improved apparatus and method for drying particulate material, in which such material is first dried by a hot gaseous drying medium to evaporate the moisture which is then carried off by the gaseous drying medium, and subsequently the particulate material is further dried by a gaseous drying medium that is at a lower temperature than the material itself, and there is further evaporation of the moisture by the heat of the material, and such evaporated moisture is carried off by the gaseous drying medium.

A further object of the instant invention is to provide an improved apparatus and process for drying particulate material in which there is a first drying zone in which the material is heated as it is dried, and there is a second drying zone in which the temperature of the material is reduced as the material is dried, and there is produced a dried product which is at approximately ambient temperature.

Still a further object of this invention is to provide an improved apparatus and process for drying particulate material, in which the material is distributed in a bed for the introduction of a gaseous drying medium to such material, and the material is fluidized during the introduction of such gaseous drying medium so as to bring the latter into contact with the particles of the material.

Still another object of this invention is to provide an improved apparatus and process for drying particulate material, which is particularly suitable for the drying of sand.

Other objects of the invention will appear hereinafter, the novel features and combinations being set forth in the appended claims.

Referring to the drawings:

FIG. 1 is an elevational view of the drying apparatus; and

FIG. 2 is a plan view of the drying apparatus, with the heater and blowers added.

Referring to the drawings, there is illustrated therein the drying apparatus for the particulate material, which is supported on a base 10 that stands on the floor. Above the base 10 there is the frame 11 of a vibrating feeder 12. A plurality of spring bars 13 are secured to the base 10 and to the frame 11, and are disposed in a rearwardly inclined position. A motor 14 on the base 10 drives an eccentric operator 15, by which the frame 11 and the vibrating feeder 12 are vibrated in a fore and aft direction on the spring bars 13, thereby to impel the particulate material from one end of the deck 16 to the other end thereof in the direction indicated by the arrow. There is a chute 17 at one end of the vibrating feeder 12 for delivery of the particulate material to the deck 16, and a discharge chute 18 at the other end of the vibrating feeder 12 for discharging the particulate material after it has been dried.

There is a plenum 20 below the deck 16 of the vibrating feeder 12, and such plenum 20 extends along the full length of and is as wide as the deck 16. The plenum 20 is divided along its length into four chambers 21, 22, 23, 24, which are of equal size. In the plenum 20, a first panel 25 divides the first and second chambers 21, 22, a second panel 26 divides the second and third chambers 22, 23, and a third panel 27 divides the third and fourth chambers 23, 24. The first, second and third chambers 21, 22, 23 of the plenum 20 define a first drying zone on the deck 16 of the vibrating feeder 12, and the fourth chamber 24 defines a second drying zone on the deck 16 of the vibrating feeder 12.

A gaseous drying medium, for which air is used, is introduced into the particulate material on the deck 16 by means of the plenum 20, in order to dry the material. There is a first port 28 for the first chamber 21, a second port 29 for the second chamber 22, a third port 30 for the third chamber 23, and a fourth port 31 for the fourth chamber 24, through which the air is blown into the several chambers of the plenum 20.

For the first drying zone the gaseous drying medium, which is air, is heated to a temperature which is considerably higher than the temperature of the material which is delivered to the vibrating feeder 12. There is a combined heater and blower 35, which has a blower 36 and a direct gas-fired air heater 37 for supplying a sufficient volume of air at the proper temperature for accomplishing the drying of the particulate material in the first drying zone above the first, second and third chambers 21, 22, 23 of the plenum 20. The heated air is blown into a main hot air duct 38, which has three branch ducts 39, 40, 41 that are connected to the ports 28, 29, 30 by flexible connections 42, 43, 44 respectively, so that the vibration of the feeder 12 will not affect the ductwork. The branch ducts 39, 40, 41 have dampers 45, 46, 47, respectively, by which the volume of air that is blown into the respective chambers 21, 22, 23 of the plenum 20 may be regulated.

For the second drying zone, above the plenum chamber 24, the air of the gaseous drying medium is supplied by a blower 48, on which the discharge duct 49 is connected to the port 31 by a flexible connection 50 so that it will not be affected by the vibration of the feeder 12. The blower 48 supplies air to the chamber 24 at approximately ambient temperature.

The deck 16 of the vibrating feeder 12 is perforate so that the gaseous drying medium is blown up through the deck 16 and through the particulate material that is on the deck. The perforations of the deck 16 may be of the order of 0.006" in size and may amount to about four percent of the deck area, so that there is little or no likelihood of the particulate material falling through the perforations.

The material is kept in motion and is impelled forwardly on the deck 16 by the vibrations of the vibrating feeder 12, and with the air blowing upwardly through the perforate deck 16 and into and through the particulate material on the deck 16, there is produced a fluidized condition of the material on the deck 16. This is a levitation of the particles of the particulate material by the gaseous drying medium, to bring the gaseous drying medium into contact with the particles of the particulate material and to produce the most effective drying action.

There is an exhaust hood 52 above the deck 16 and it covers the width and length of the deck 16. There are upstanding branch ducts 53, 54, 55, 56 that are connected to the top of the exhaust hood 52 by flexible connections 57, 58, 59, 60, respectively, and positioned above the plenum chambers 21, 22, 23, 24, respectively. The several upstanding branch ducts 53, 54, 55, 56 are connected to a longitudinally extending main exhaust duct 61. At one end of the main exhaust duct 61, there is an exhaust bleed damper 62 to control the volume of air that is exhausted. At the other end of the exhaust duct 61 there is a blower section 63, with a motor 64 to drive an exhaust blower in the blower section 63.

The exhaust system, including the exhaust hood 52, provides a negative air pressure in the exhaust hood 52 to augment the flow of air through the deck 16 and through the particulate material for drying the latter. The air is exhausted to the atmosphere through the open end 65 of the main exhaust duct 61, or there may be provided a dust collector for receiving any dust that might be entrained in the exhaust air, and to remove such dust prior to discharge of the exhausting air to the atmosphere.

In the process of drying the particulate material, which may be sand, hot air at a temperature that is considerably higher than the initial temperature of the material is blown into the plenum chambers 21, 22, 23 below the first drying zone of the deck 16. Such hot air levitates the particles of the material and fluidizes the bed of particulate material so that the gaseous drying medium comes into contact with the individual particles of the material to dry the latter. The hot air heats the liquid which is entrained with the particles of the material, and also heats the material. The heat of the gaseous drying medium is thus utilized in the first drying zone to evaporate the liquid, and the vapor that is so formed is carried off with the gaseous drying medium through the upstanding branch ducts 53, 54, 55 and the main exhaust duct 61. In the course of evaporating the liquid, and heating the particles of the material, the temperature of the latter is greatly increased, such that the material remains at a relatively high temperature compared to its initial temperature when it leaves the first drying zone.

Thus, the material is at the higher temperature when it enters the second drying zone above the plenum chamber 24. The gaseous drying medium from the blower 48 is maintained at approximately ambient temperature, and is blown into the plenum chamber 24, and through the perforate bed 16, and through the particulate material on the bed, such that the particles of the material are levitated and there is produced a fluidized condition of the particulate material. This brings the air of the gaseous drying medium into close and intimate contact with the particles of the material. In the second drying zone the heat of the material causes the remaining liquid to be evaporated, and the vapor that is so formed is carried off in the gaseous drying medium, with the result that the temperature of the particulate material is substantially reduced to approximately or slightly above ambient temperature at the discharge chute 18. The air of the gaseous drying medium from the second drying zone discharges through the upstanding exhaust duct 56 and the main exhaust duct 61.

The apparatus and process which has been described heretofore has been applied to the drying of sand with outstanding results. The sand may initially have twenty to thirty percent moisture content that is water. The moisture is preliminarily reduced by permitting the moisture to drain by gravity from the sand in a storage pile, or the moisture may be removed by a vacuum filter, or by a continuous centrifuge. After such pre-dewatering the sand may have moisture content of the order of six percent. Such sand may be delivered to the vibrating feeder 12 at a rate of about fifty tons per hour. The temperature of the drying air from the heater-blower unit 35 is maintained at about 400° F. The initial temperature of the sand, as delivered to the vibrating feeder 12, may be about 70° F. In the course of moving through the first drying zone, the temperature of the sand is increased from about 70° F. to about 140° F., while the moisture content is reduced to about 1.15%. In the second drying zone, the temperature of the air that is supplied by the blower 48 is maintained at about 70° F., the temperature of the sand is reduced from approximately 140° F. at the beginning of the second drying zone to approximately 80° F. at the discharge chute 18, and the moisture content is reduced to approximately .20%. In the second drying zone the heat of the particulate material causes the remaining moisture to evaporate, and the vapor is carried off in the air.

Thus, there is a highly effective apparatus and process for drying the particulate material by a gaseous drying medium in which the evaporated liquid is carried off from the material. In the course of drying the material, the temperature of the material is increased considerably, and this heat is later used to further evaporate liquid from the material. The product that is discharged from the apparatus is substantially dry and is at about ambient temperature so that it may be comfortably handled, and it is not necessary to supply any special equipment for withstanding the heat of the material.

Obviously those skilled in the art may make various changes in the details and arrangement of parts without departing from the spirit and scope of the invention as defined by the claims hereto appended, and applicants therefore wish not to be restricted to the precise construction herein disclosed.

Having thus described and shown an embodiment of the invention, what it is desired to secure by Letters Patent of the United States is:

1. The process of drying sand comprising, moving said sand through a first drying zone and through a second drying zone, heating a first gaseous drying medium comprising air to an elevated temperature that is considerably higher than the initial temperature of the sand, blowing said air through the sand in said first drying zone and fluidizing the sand thereby to bring the air into contact with the sand and water in order to evaporate water from said sand by heating the water and by heating the sand which causes the temperature of the sand to be greatly raised above the initial temperature of the sand, removing the evaporated water in said air, blowing a second gaseous drying medium comprising air that is at a temperature considerably below that of the heated sand through the sand in said second drying zone and fluidizing the sand thereby to bring the air into contact with the sand and water in order to evaporate water from the sand by the heat of the sand and thereby reducing the temperature of the sand, removing such evaporated water in said air, said sand in said first drying zone is initially at approximately ambient temperature and is heated to a temperature of approximately 140° F., and the temperature of said sand in said second drying zone is reduced from approximately 140° F. to approximately ambient temperature.

2. Apparatus for drying particulate material comprising a conveyor for moving said material along a drying path that has a first drying zone and a second drying zone, a first plenum for said first drying zone, a second plenum for said second drying zone, means for heating a first gaseous drying medium to a temperature that is considerably higher than the initial temperature of said material, a first blower connected to said heating means and connected to said first plenum for supplying said first gaseous drying medium from the heating means to said material in said first drying zone, a second blower connected to said second plenum for supplying a second gaseous drying medium at approximately ambient temperature to said material in said second drying zone, an exhaust hood over said first drying zone for the first gaseous drying medium and over said second drying zone for the second gaseous drying medium, exhaust means connected to said exhaust hood for exhausting said first gaseous drying medium and said second gaseous drying medium with the evaporated liquid from said first drying zone and from said second drying zone, said conveyor is a vibrating conveyor with a longitudinally extending deck for the material that forms the drying path for the material, said first plenum and said second plenum being disposed in succession below said deck, and said exhaust hood being disposed above said deck.

References Cited
UNITED STATES PATENTS

| | | | |
|---|---|---|---|
| 2,715,282 | 8/1955 | Niven | 34—66 X |
| 2,865,109 | 12/1958 | Bardet | 34—66 |
| 3,319,346 | 5/1967 | Schuster | 34—28 |

KENNETH W. SPRAGUE, *Primary Examiner.*